(12) United States Patent
Bradski et al.

(10) Patent No.: US 7,783,114 B2
(45) Date of Patent: Aug. 24, 2010

(54) TRAINING AND USING CLASSIFICATION COMPONENTS ON MULTIPLE PROCESSING UNITS

(75) Inventors: Gary Bradski, Palo Alto, CA (US); Jason C. Chuang, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 11/466,403

(22) Filed: Aug. 22, 2006

(65) Prior Publication Data
US 2008/0050014 A1    Feb. 28, 2008

(51) Int. Cl.
*G06K 9/62* (2006.01)
(52) U.S. Cl. .................. 382/224; 382/226; 382/227
(58) Field of Classification Search .......... 382/224, 382/226, 227; 707/E17.012, E17.05, E17.087
See application file for complete search history.

(56) References Cited

U.S. PATENT DOCUMENTS

| | | | | |
|---|---|---|---|---|
| 6,941,266 | B1 * | 9/2005 | Gorin et al. | 704/257 |
| 2005/0130230 | A1 * | 6/2005 | Davalos et al. | 435/7.1 |
| 2006/0122834 | A1 * | 6/2006 | Bennett | 704/256 |

OTHER PUBLICATIONS

Breiman, L., "Consistency for a Simple Model of Random Forests", Technical Report 670, Sep. 9, 2004, 10 PP.*

Breiman, L., and A. Cutler, "Random Forests", Classification Description, [online], [Retrieved on May 12, 2006], 28 pp., retrieved from the Internet at http:I/www.stat.berkley.edu/usersIbreimanIRandomForests/cc_home. htm>.*

Breiman, L., "Random Forests", Machine Learning, 45, 5-32, 2001,28 pp.*

Statsoft, Inc., "Classification and Regression Trees (C&RT)", [online], 2003, [Retrieved on Jun. 8, 2006], 8 pp., retrieved from the Internet at /www.statsoft.com/textbook/stcart.html>.*

(Continued)

*Primary Examiner*—Bhavesh M Mehta
*Assistant Examiner*—Gregory F Cunningham
(74) *Attorney, Agent, or Firm*—Konrad Raynes & Victor LLP; David W. Victor

(57) ABSTRACT

Provided are a method, system, and computer readable medium for training and using classification components on multiple processing units. A plurality of processing units each has a memory including one of a plurality of subsets of a set of data points. At least two of the processing units have different subsets of data points. A plurality of classification components are executed by the processing units. Classification components executing at the processing units are trained, wherein each classification component is trained with the subset of data points in the memory of the processing unit that is executing the classification component. One of the classification components is transferred to an additional processing unit of the processing units to train the transferred classification component using the subset of data points in the memory at the additional processing unit in response to training the classification component with the subset of data points.

30 Claims, 6 Drawing Sheets

OTHER PUBLICATIONS

Breiman, L., and A. Cutler, "Random Forests", Classification Description, [online], [Retrieved on May 12, 2006], 28 pp., retrieved from the internet at <URL: http://www.stat.berkley.edu/users/breiman/RandomForests/cc_home.htm>.

Breiman, L., "Random Forests", Machine Learning, 45, 5-32, 2001, 28 pp.

Chen, C., A. Liaw, and L. Breiman, "Using Random Forest to Learn Imbalanced Data", Technical Report 666, 2004, pp. 1-12.

George Mason University, "Random Forests", Course Document for STAT 789, [online], Summer 2005, [retrieved on Jun. 8, 2006], 5 pp., retrieved from the internet at <URL: http://mason.gmu.edu/~csutton/rf10789cr.html>.

Statsoft, Inc., "Classification and Regression Trees (C&RT)", [online], 2003, [Retrieved on June 8, 2006], 8 pp., retrieved from the Internet at <URL: http://www.statsoft.com/textbook/stcart.html>.

Topic, G., T. Smuc, Z. Sojat, and K. Skala, "Reimplementation of the Random Forest Algorithm", Parallel Numerics '05, 2005, Chapter 5: Optimization and Classification, pp. 119-125.

Wikipedia, "Decision Tree", [online], [Retrieved on Jun. 10, 2006], 5 pp., retrieved from the Internet at <URL: http://en.wikipedia.org/w/index.php?title=Decision_tree&printable=yes>.

* cited by examiner

TRAINING AND USING CLASSIFICATION COMPONENTS ON MULTIPLE PROCESSING UNITS

BACKGROUND

There are numerous machine learning algorithms that may be used to classify data variables, where such algorithms may be trained to produce desired classification decisions from a set of data points. Classification algorithms involve an attempt to predict values of a categorical dependent variable (e.g., class, type, group membership, etc.) from predictor variables. For instance, a classification algorithm may be used to predict who is likely to purchase a product based on characteristics or traits of consumers, whether a particular email or program is malicious, e.g., a virus, SPAM, etc., whether a particular transaction is fraudulent, etc.

A decision tree is a machine learning predictive model used to map variables to a classification output. One classification technique known as a "random forest" involves independently training decision trees, such as classification and regression trees (CART), on a set of data points. A random forest is a "forest" of decision trees, where each tree may be randomly perturbed during training on the data points from the other trees to produce independent trees.

In one implementation, as a tree of the forest is grown, not every predictor is considered each time a split is made. Instead, a randomly selected subset of the predictors is considered, and the best possible split which can be created using one of the randomly selected predictors is used. For instance, if there are M variables or features, then during training "m" of those M features may be selected as input variables to each node of the tree, where m may be significantly less than M, such as the square root of M. Each tree may be fully grown using the CART method, but not pruned.

Once the trees are trained they may be used to classify new data by inputting the data to all the trees. A final classification decision is then based on the separate classification decisions reached by all the decision trees in the "forest", such as by a majority vote or an average of classification values. Random forests have been observed to provide a substantial performance improvement over a single tree classifier, such as a single CART tree.

DETAILED DESCRIPTION

Figure 1:
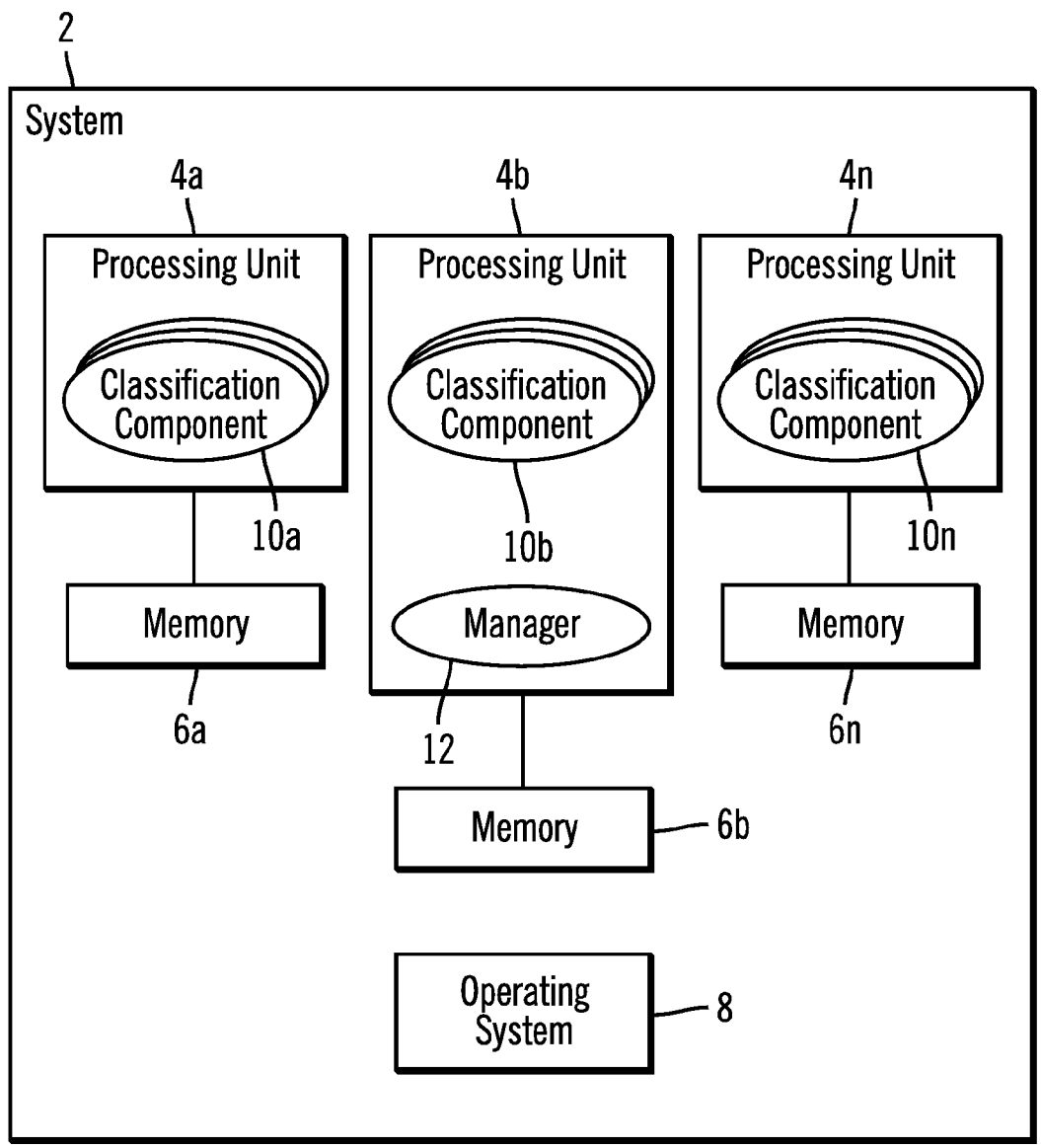
FIG. 1 illustrates an embodiment of a system including classification components.

FIG. 1 illustrates a computing environment used with the described embodiments. A system 2 includes a plurality of processing units $4a, 4b \ldots 4n$ each coupled to a memory $6a, 6b \ldots 6n$. The memories $6a, 6b \ldots 6n$ store programs and data used by the processors $4a, 4b \ldots 4n$ during system operations. The system includes an operating system 8 to manage processing unit $4a, 4b \ldots 4n$ operations. The processing units $4a, 4b \ldots 4n$ may comprise separate microprocessor devices or separate cores on one or more microprocessor devices. Alternatively, the processing units $4a, 4b \ldots 4n$ may comprise separate processes executing on a single processor. The memories $6a, 6b \ldots 6n$ may comprise an on-board cache, such as a Level 2 cache or a separate memory device, such as a volatile or non-volatile memory device.

Each processing unit $4a, 4b \ldots 4n$ is shown as executing multiple classification components $10a, 10b \ldots 10n$. The classification components $10a, 10b \ldots 10n$ process data points maintained in memory $6a, 6b \ldots 6n$ to provide a classification value of the data points. The classification components $10a, 10b \ldots 10n$ may comprise decision trees having nodes at which decisions are made with respect to the data. In one embodiment, the classification components $10a, 10b \ldots 10n$ may comprise Classification and Regression Trees (CART) that combined form a decision forest or forest of decision trees. A manager 12 executes on one of the processing units $4b$ and manages the classification component $10a, 10b \ldots 10n$ training and run-time classification operations.

Figure 2:
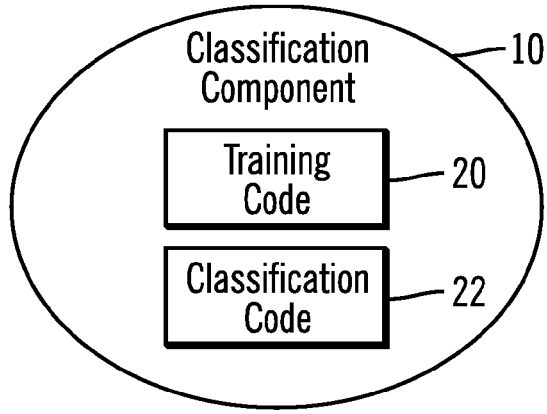
FIG. 2 illustrates an embodiment of code associated with the classification components.

FIG. 2 illustrates an embodiment of a classification component 10, such as classification components $10a, 10b \ldots 10n$, as associated with training code 20 and classification code 22. The training code 20 is the code the classification components $10a, 10b \ldots 10n$ or some other component executes to train the classification code 22 on a set of data to classify the data properly. The classification code 22 comprises the code the classification components $10a, 10b \ldots 10n$ execute to classify data as part of runtime classification operations. Each classification component $10a, 10b \ldots 10n$ may have a different instance of the training 20 and/or classification 22 code, or one instance may be shared among multiple classification components.

Figure 3:
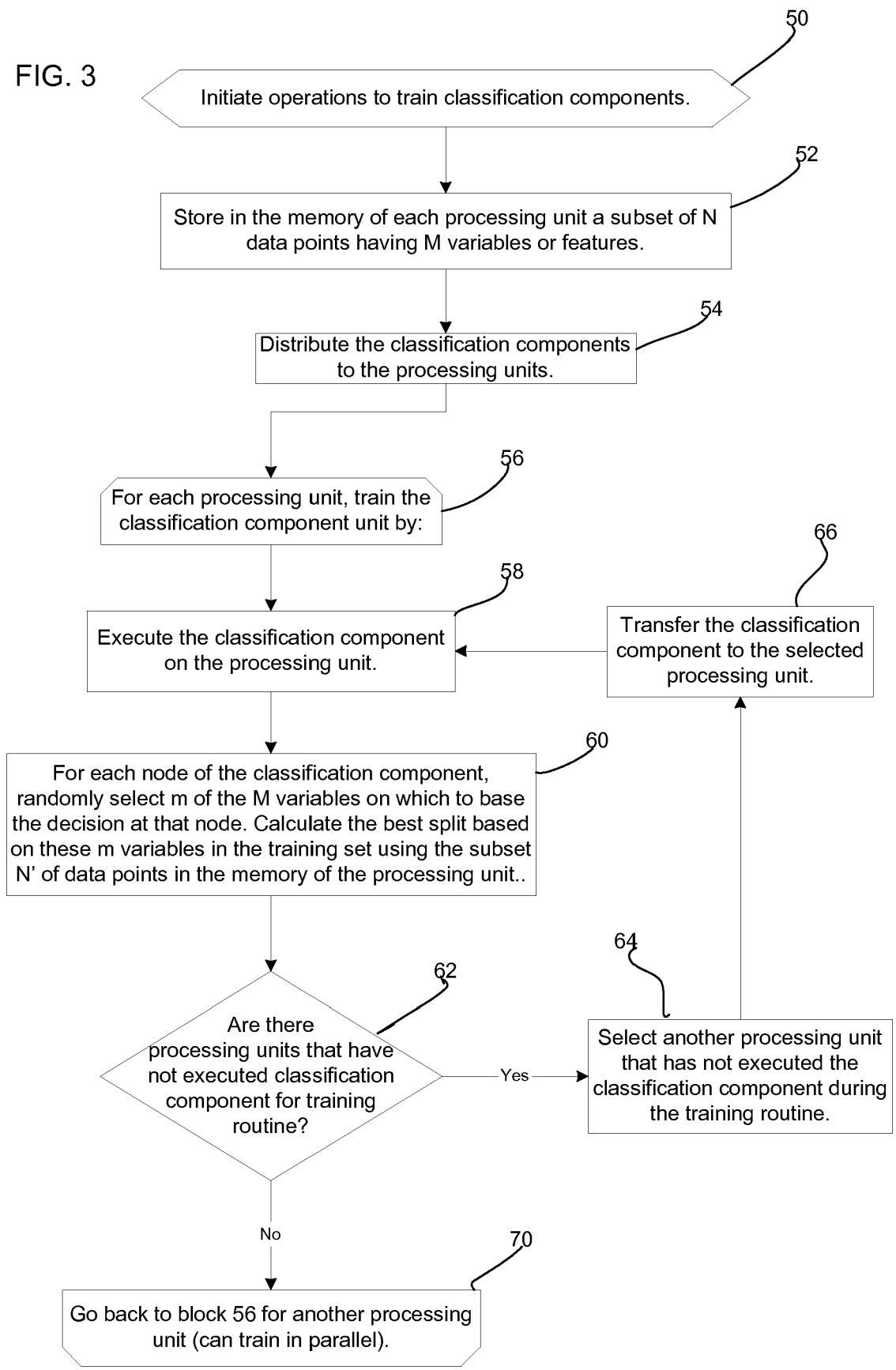
FIG. 3 illustrates an embodiment of operations to train the classification components of the system of FIG. 1.

FIG. 3 illustrates an embodiment of operations performed in the system 2 to train the classification code 22 of the classification components $10a, 10b \ldots 10n$. Upon initiating (at block 50) training operations, the manager 12 stores (at block 52) in the memory $6a, 6b \ldots 6n$ of each processing unit $4a, 4b \ldots 4n$ a subset of N data points having M variables or features. Each subset of the data points to train upon provided to the memories $6a, 6b \ldots 6n$ may include data for all or less than all of the M variables. In one embodiment, the combination of all the subsets in the memories $6a, 6b \ldots 6n$ may represent the entire set of N data points. Alternatively, the combination of the subsets in the memories $6a, 6b \ldots 6n$ may comprise less than all the N data points. The manager 12 may distribute (at block 54) the classification components $10a, 10b \ldots 10n$ to the processing units $4a, 4b \ldots 4n$ to distribute the workload of the classification components across the processing units $4a, 4b \ldots 4n$. Blocks 56 through 70 illustrate a loop of operations implemented in the training code 20 of the classification components $10a, 10b \ldots 10n$ to train the classification component $10a, 10b \ldots 10n$ classification code 22.

Classification components 10a, 10b ... 10n may be trained in parallel on the processing units 4a, 4b ... 4n.

To train the classification code 22 of one classification component 10a, 10b ... 10n, the classification component 10a, 10b ... 10n is executed (at block 58) on one processing unit 4a, 4b ... 4n. For each node of the classification component 10a, 10b ... 10n, the training code 20 of the classification component 10a, 10b ... 10n randomly selects (at block 60) m of the M variables on which to base the decision at that node, where "m" may be significantly less than M, such as the square root of M. The classification component 10a, 10b ... 10n training coded 20 may calculate the best split based on these m variables using the subset N of data points in the memory 6a, 6b ... 6n of the processing unit 4a, 4b ... 4n executing the classification component 10a, 10b ... 10n. In one embodiment, the classification components 10a, 10b ... 10n are grown using the CART method, but not pruned. In this embodiment, the classification components 10a, 10b ... 10n are perturbed during training on the data set from the other components to make the classification components independent of one another. The classification components 10a, 10b ... 10n may form a random forest of decision trees.

After training the tree, i.e., classification code 22, on one processing unit 4a, 4b ... 4n, if (at block 62) there are processing units 4a, 4b ... 4n that have not executed the classification component 10a, 10b ... 10n as part of the training routine, then another processing unit 4a, 4b ... 4n is selected (at block 64) that has not executed the classification component 10a, 10b ... 10n during the training routine. The classification component 10a, 10b ... 10n is transferred (at block 66) to the selected processing unit 4a, 4b ... 4n and control proceeds to block 58 to train on that selected processing unit 4a, 4b ... 4n. The manager 12 may select the processing unit 4a, 4b ... 4n or the classification component 10a, 10b ... 10n may determine itself whether to migrate to another processing unit 4a, 4b ... 4n to train on the subset of data points maintained in that selected processing unit's memory 6a, 6b ... 6n.

Figure 4:
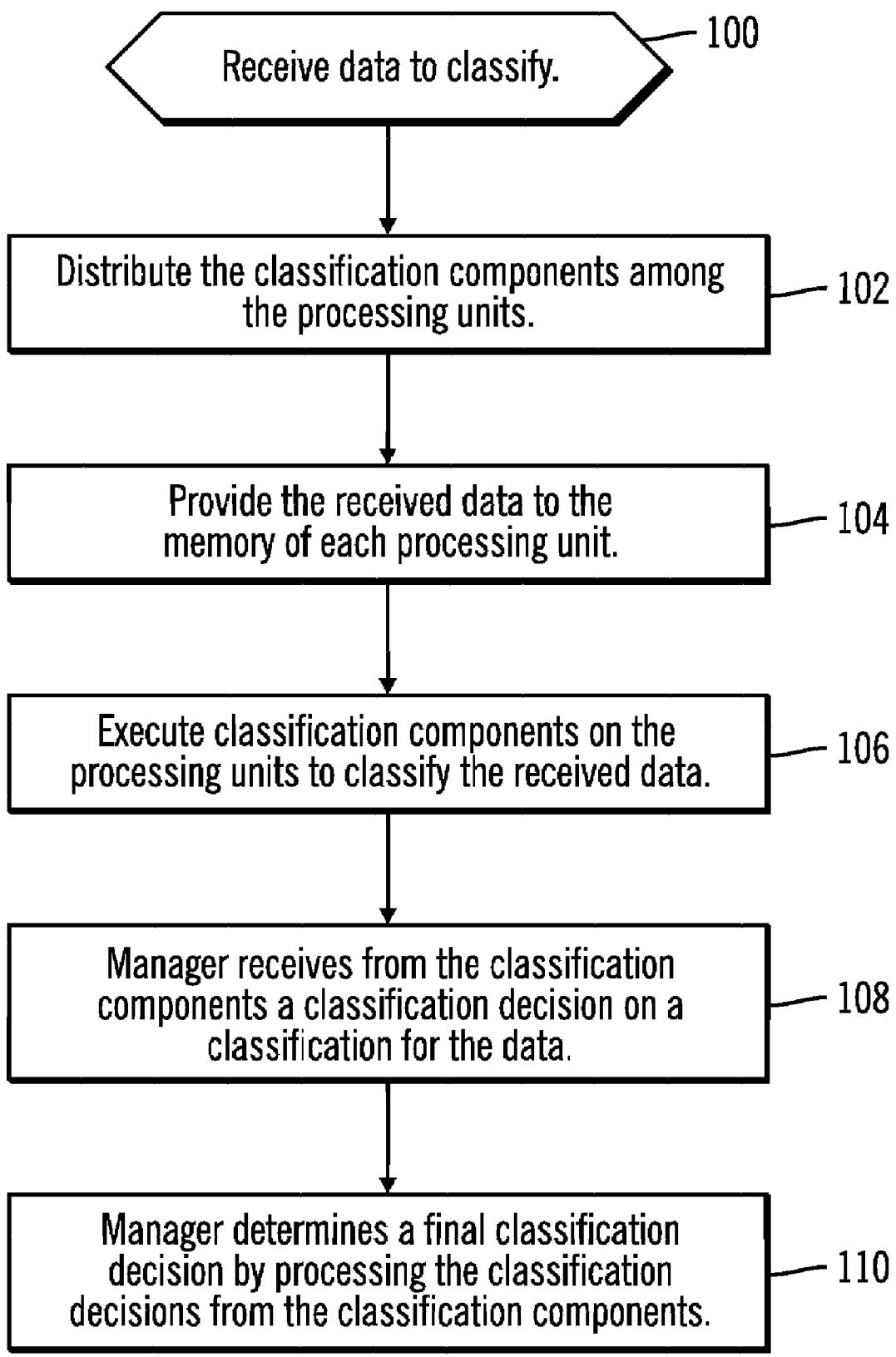
FIG. 4 illustrates an embodiment of operations to use the classification components trained according to the operations of FIG. 3 to classify received data.

FIG. 4 illustrates an embodiment of operations implemented in the manager 12 and classification code 22 of the classification components 10a, 10b ... 10n to classify data as part of run-time classification operations following the training. Upon receiving (at block 100) data to classify, which may include values for all the M variables on which the classification components 10a, 10b ... 10n trained, the manager 12 distributes (at block 102) the classification components 10a, 10b ... 10n among the processing units 4a, 4b ... 4n and provides (at block 104) the received data to the memory 6a, 6b ... 6n of each processing units 4a, 4b ... 4n. The processing units 4a, 4b ... 4n then execute (at block 106) the trained classification code 22 of the classification components 10a, 10b ... 10n to separately classify the received data. The manager 12 receives (at block 108) from the classification components 10a, 10b ... 10n a classification decision for the received data. The manager 12 determines (at block 110) a final classification decision by processing the classification decisions from the classification components 10a, 10b ... 10n. The manager 12 may select the classification value selected by the majority of classification components 10a, 10b ... 10n or take the average of the classification decisions from the classification components 10a, 10b ... 10n to determine a final classification value for the received data.

With the embodiments of FIGS. 1, 2, 3, and 4, the classification components 10a, 10b ... 10n are trained by transferring the classification components 10a, 10b ... 10n among the processing units 4a, 4b ... 4n so that the classification components 10a, 10b ... 10n train on all the subsets of data points at the processing units 4a, 4b ... 4n. In this way, for training, the data points are distributed among multiple processing units 4a, 4b ... 4n and the classification components, as opposed to the data points, are transferred to minimize communication bandwidth. In embodiments where the classification components 10a, 10b ... 10n comprise substantially less bytes than the training data points, bandwidth is conserved by transferring the classification components 10a, 10b ... 10n instead of the data points.

Figure 5:
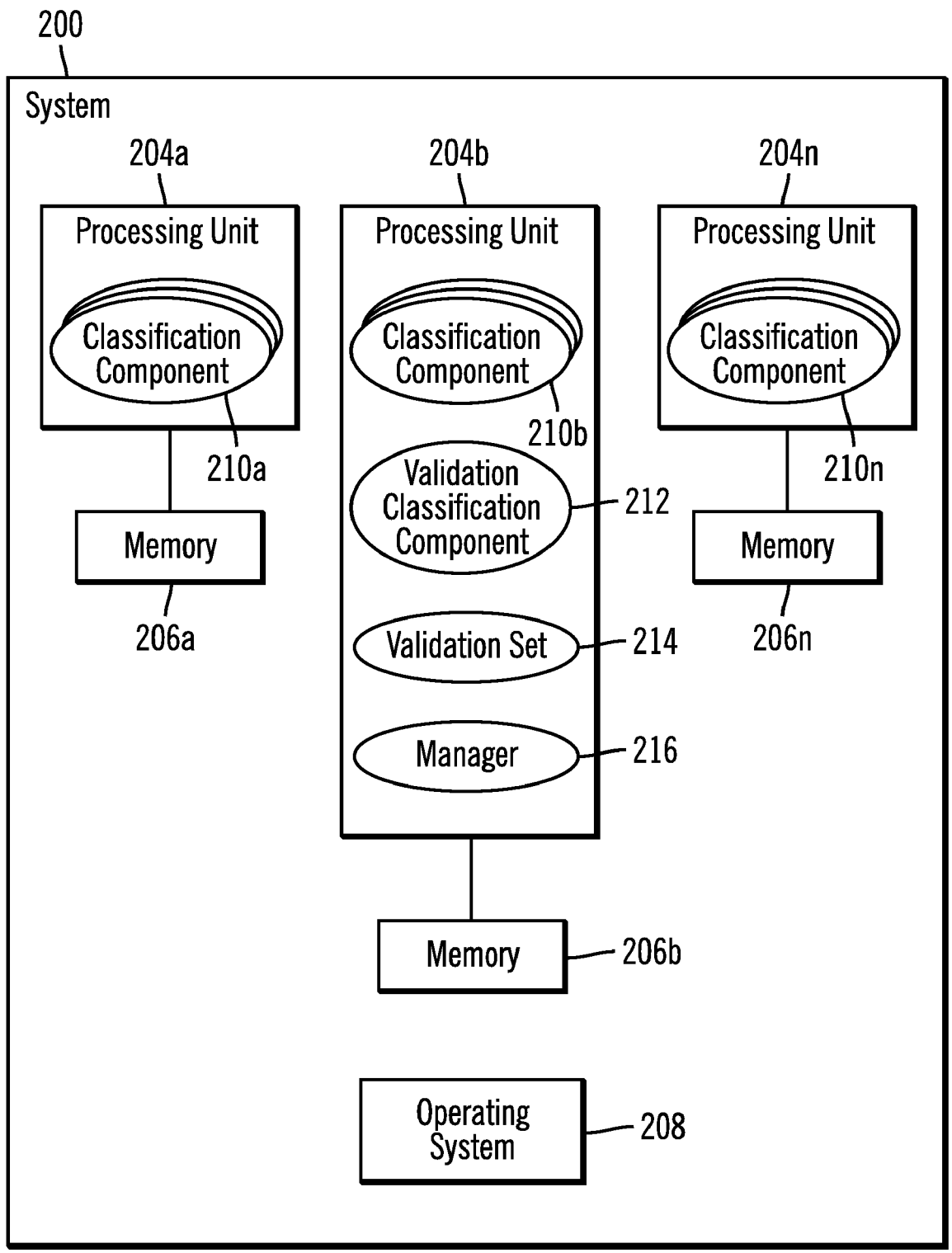
FIG. 5 illustrates an embodiment of a system including classification components and a second level classification component.

FIG. 5 illustrates a system 200 comprising an alternative embodiment of the computing system of FIG. 1. The system 200 includes elements 204a, 204b ... 204n, 206a, 206b ... 206n, 208, 210a, 210b ... 210n, and 216 which correspond to the elements 4a, 4b ... 4n, 6a, 6b ... 6n, 8, 10a, 10b ... 10n, and 12 of the system 2 of FIG. 1, respectively. System 200 further includes a validating classification component 212 that receives a validation set 214 including the classification decisions of the classification components 210a, 210b ... 210n. A validation classification component 212 performs a second level classification operation to provide a classification outcome based on the classification outputs from the classification components 210a, 210b ... 210n that are maintained in a validation set 214. The classification components 210a, 210b ... 210n may utilize a different decision tree algorithm from the algorithm used by the validation classification component 212. For instance, the classification components 210a, 210b ... 210n may use the CART algorithm and the validation classification component 212 may utilize a different machine learning algorithm, such as a different decision tree type algorithm, neural network, a support vector machine, etc. A manager 216 executing on one or more processing units 204a, 204b ... 204n may manage the training and classification operations of the classification components 210a, 210b ... 210n and 212.

The classification components 210a, 210b ... 210n and 212 may be associated with training code 20 and classification code 22 portions (FIG. 2) to perform training and classification operations, respectively. Each classification component 210a, 210b ... 210n and 212 may have a different instance of the training 20 and/or classification 22 code, or one instance may be shared among multiple classification components. Further, the validation classification component 212 may be associated with training 20 and classification 22 code having different algorithms from the training 20 and classification 22 code associated with the classification components 210a, 210b ... 210n.

Figure 6:
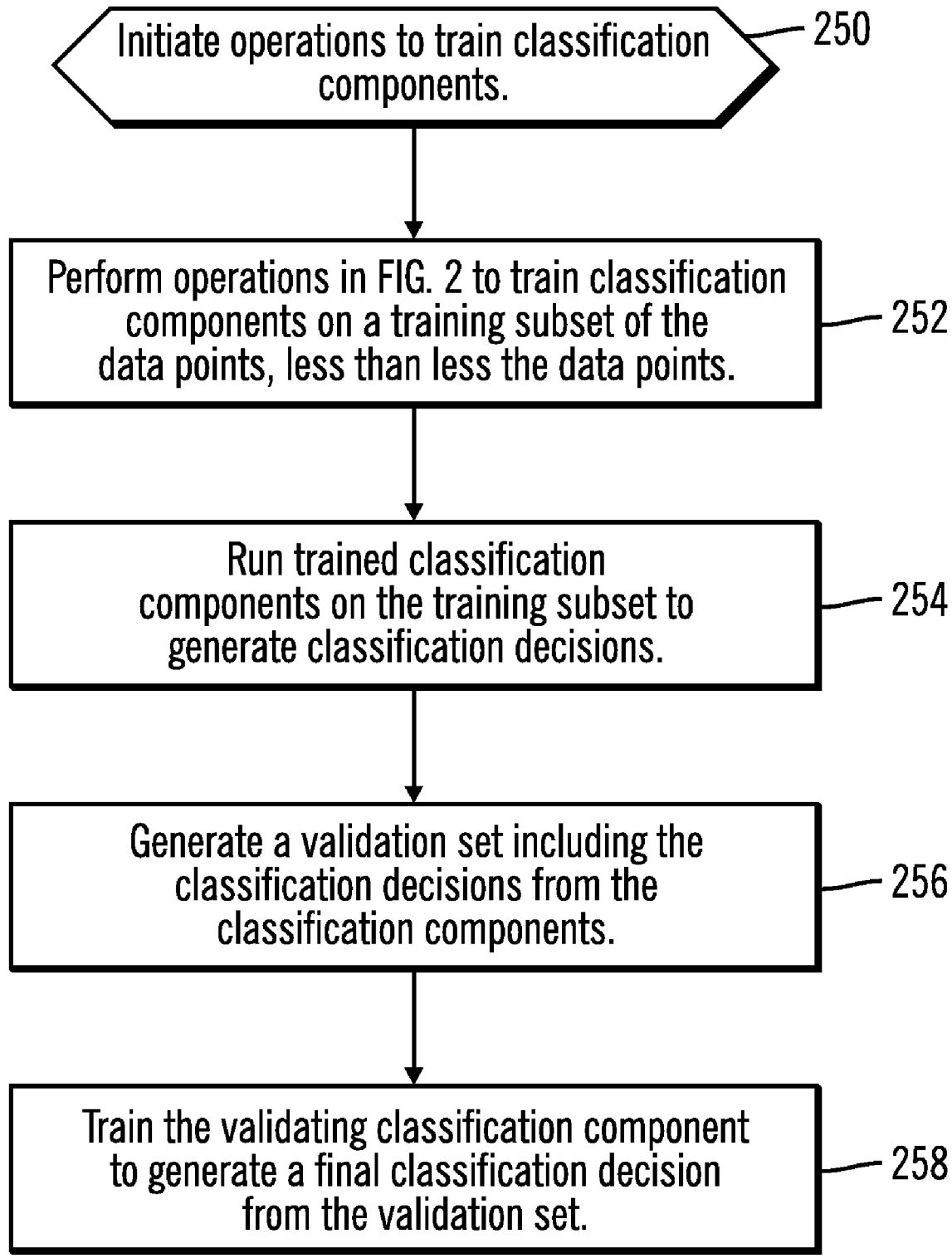
FIG. 6 illustrates an embodiment of operations to train the classification components and second level classification component of the system of FIG. 5.

FIG. 6 illustrates an embodiment of operations implemented in the manager 216 and the training code 20 of classification components 210a, 210b ... 210n and 212 to train the classification components 210a, 210b ... 210n and validation classification component 212 in the system 200 of FIG. 5. Upon initiating (at block 250) operations to train the classification components, the operations in FIG. 3 are performed (at block 252) to train the classification code 22 of the classification components 210a, 210b ... 210n on a training subset of the data points, which may comprise less than all the set of data points. In one embodiment, the subsets of data points in the memories 206a, 206b ... 206n may comprise less than the entire set of all the data points, such as for cases when the set of data points is exceptionally large. As discussed, the classification components 210a, 210b ... 210n may be trained as independent CART trees in a decision forest. The manager 216 may then run (at block 254) the classification code 22 of the trained classification components 210a, 210b ... 210n on the training subset to generate classification decisions. A validation set 214 is generated (at block 256) to include the classification decisions on the training subset from the classification components 210a, 210b . . . 210n. The validation set 214 may be generated by the classification components 210a, 210b . . . 210n independently writing their classification decisions to the validation set 214. In such an embodiment, the validation set 214 is passed to the processing units 204a, 204b . . . 204n, where the classification components 210a, 210b . . . 210n executing thereon can write their classification decisions to the validation set 212. Alternatively, the manager 216 may gather the classification decisions from the classification components 210a, 210b . . . 210n and then write them to the validation set 214. The validation classification component 212 is trained (at block 258), using its training code 20, to generate a final classification decision from the validation set 214.

In a further embodiment, the validation classification component 212 may perform the validation on data that was not used in the original classification. For instance, if all the data M is not used to train the lower level classification or regression components 210a, 21b . . . 21n, previously unused data my be used form the validation set 214 which is used to train the validation classification component 212.

Figure 7:
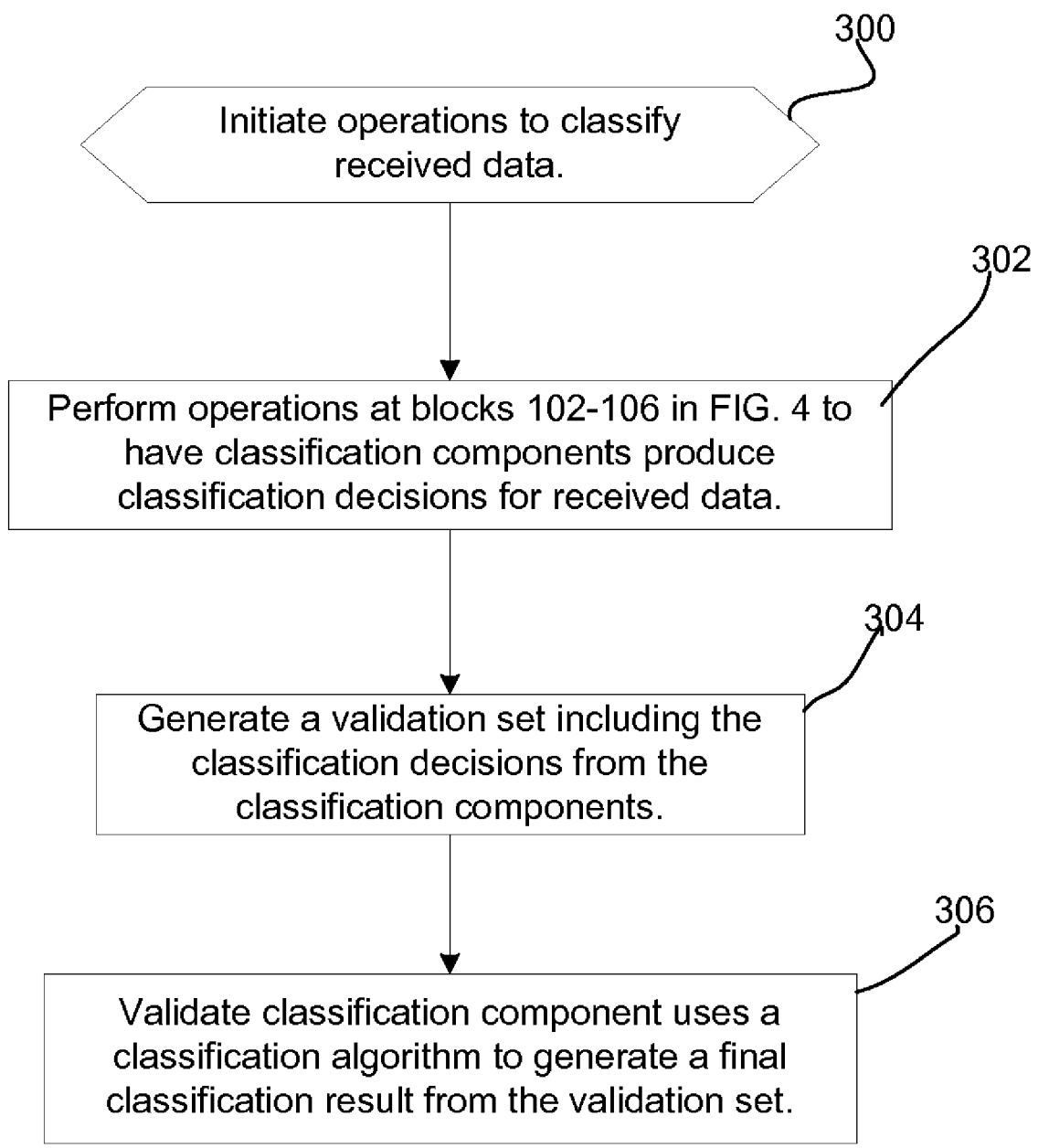
FIG. 7 illustrates an embodiment of operations to use the classification components trained according to the operations of FIG. 6 to classify received data.

FIG. 7 illustrates an embodiment of operations implemented in the manager 216 and classification code 22 of the classification components 210a, 201b . . . 210n and 216 to classify received data using the trained classification components 210a, 210b . . . 210n and validation classification component 212. Upon receiving (at block 300) data points to classify, the system 200 performs (at block 302) the operations at blocks 102-106 in FIG. 4 to have the classification components 210a, 210b . . . 210n classification code 22 produce classification decisions for the received data. A validation set 214 is generated (at block 304) including the classification decisions from the classification components 210a, 210b . . . 210n. The validation classification component 212 classification code 22 uses (at block 306) a classification algorithm, which may be different from the classification algorithm used by the classification code 22 of the classification components 210a, 210b . . . 210n, to generate a final classification result from the validation set 212.

The described embodiment of FIG. 5 and operations of FIGS. 6 and 7 are used to provide a second level classifier to determine a final decision based on the decisions made by the first level classification components 210a, 210b . . . 210n. This embodiment may be used to improve the outcome from the first level classification components 210a, 210b . . . 210n. For instance, if the training data set used to train the first level classification components 210a, 210b . . . 210n was less than the full set of data points, then there may be a concern that the classification components 210a, 210b . . . 210n were not trained to the fullest extent possible and their decisions may not be as robust or optimal as possible. In such case, the second level validation classification component 212 applies a further classification algorithm on the results of the classification components 210a, 210b . . . 210n to optimize and improve the final outcome.

In the described embodiments the classification components are used to classify data. In an additional embodiment, the classifications components 10a, 10b . . . 10n and 210a, 210b . . . 210n may implement regression techniques, such as fitting a discrete or continuous variable or function, to predict integer or continuous values.

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. A "machine readable medium" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments training code associated with the classification components is used to train the associated classification component and classification code to perform the classification operations. In alternative embodiments, different code components than those described may perform the training and classification operations.

In the described embodiments, specific machine learning algorithms were discussed for training the classification components and second level classification component, such as decision trees, CARTs, neural network, a support vector machine, etc. In alternative embodiments other suitable machine learning algorithms may be used to train the classification components to produce optimal classification decisions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A character, e.g., "n", used to represent a variable number of an element, e.g., 4a, 4b . . . 4n, 206a, 206b . . . 206n, may indicate any number of instances of the element, and may indicate different integer numbers when used with different elements or with the same element in different instances.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIGS. 2, 3, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
providing a plurality of processing units, each having a memory including one of a plurality of subsets of a set of data points, wherein at least two of the processing units memory have different subsets of data points;
providing a plurality of classification components executed by the processing units;
training the classification components executing at the processing units to produce trained classification components, wherein each classification component is trained with the subset of data points in the memory of the processing unit that is executing the classification component;
transferring each of the trained classification components to an additional processing unit of the processing units that did not previously train the trained classification component to train the transferred trained classification component using the subset of data points in the memory at the additional processing unit.

2. The method of claim 1, wherein a computer implemented manager further performs:
distributing the classification components among the processing units;
receiving data to classify;
providing the received data to the classification components;
receiving from the classification components a classification decision for the received data; and
determining a final classification decision by processing the classification decisions from the classification component.

3. The method of claim 1, wherein the set of data points is represented in the subsets of data points in the memories of the processing units.

4. The method of claim 1, wherein the classification components are transferred to each of the processing units to execute and train using the subsets of data points at each of the processing units.

5. The method of claim 1, wherein each classification component comprises a decision tree having nodes, wherein the set of data points has M variables, and wherein each node of the decision trees randomly selects m of the M variables on which to base a decision for the node.

6. The method of claim 5, wherein each decision tree comprises a classification and regression tree (CART) and wherein the CART decision trees form a random forest of trees.

7. The method of claim 1, further comprising:
gathering classification decisions from the classification components to form a validation set; and
training a validation classification component on the validation set to produce a second level classification based on the validation set.

8. The method of claim 7, wherein the classification components use a first decision algorithm to generate a classification decision and wherein the validating classification component uses a second algorithm to generate the second level classification from the validation set.

9. The method of claim 7, wherein the classification components are trained on a training subset of the set of data points.

10. The method of claim 9, wherein the subsets in the memories of the processing units are represented in the training subset.

11. A system, comprising:
at least one microprocessor implementing a plurality of processing units;
a memory for each processing unit including one of a plurality of subsets of a set of data points, wherein at least two of the processing units memory have different subsets of data points;
a computer readable storage medium including:
a plurality of classification components executed by the processing units;
training code associated with the classification components executed by the processing units to train the associated classification component with the subset of data points in the memory of the processing unit that is executing the classification component to produce trained classification components, wherein each of the trained classification components is transferred to an additional processing unit of the processing units that did not previously train the trained classification component to train the transferred trained classification component using the subset of data points in the memory at the additional processing unit.

12. The system of claim 11, further comprising:
wherein the computer readable storage medium includes a manager executed to:
   distribute the classification components among the processing units;
   receive data to classify;
   provide the received data to the classification components;
   receive from the classification components a classification decision for the received data; and
   determine a final classification decision by processing the classification decisions from the classification component.

13. The system of claim 11, wherein the set of data points is represented in the subsets of data points in the memories of the processing units.

14. The system of claim 11, wherein the classification components are transferred to each of the processing units to execute and train using the subsets of data points at each of the processing units.

15. The system of claim 11, wherein each classification component comprises a decision tree having nodes, wherein the set of data points has M variables, and wherein each node of the decision trees randomly selects m of the M variables on which to base a decision for the node.

16. The system of claim 15, wherein each decision tree comprises a classification and regression tree (CART) and wherein the CART decision trees form a random forest of trees.

17. The system of claim 11, further comprising:
   code executed on at least one of the processing units to gather classification decisions from the classification components to form a validation set; and
   a validation classification component trained on the validation set to produce a second level classification based on the validation set.

18. The system of claim 17, wherein the classification components use a first decision algorithm to generate a classification decision and wherein the validating classification component uses a second algorithm to generate the second level classification from the validation set.

19. The system of claim 17, wherein the classification components are trained on a training subset of the set of data points.

20. The system of claim 19, wherein the subsets in the memories of the processing units are represented in the training subset.

21. A computer readable storage medium in communication with a plurality of processing units each having a memory, wherein the computer readable storage medium includes code executed by the processing units to perform operations, the operations comprising:
   providing one of a plurality of subsets of a set of data points to the memory of each processing unit, wherein at least two of the processing unit memories have different subsets of data points;
   providing a plurality of classification components executed by the processing units;
   training the classification components executing at the processing units to produce trained classification components, wherein each classification component is trained with the subset of data points in the memory of the processing unit that is executing the classification component; and
   transferring each of the trained classification components to an additional processing unit of the processing units that did not previously train the trained classification component to train the transferred trained classification component using the subset of data points in the memory at the additional processing unit.

22. The computer readable storage medium of claim 21, wherein the operations further comprise:
   distributing the classification components among the processing units;
   receiving data to classify;
   providing the received data to the classification components;
   receiving from the classification components a classification decision for the received data; and
   determining a final classification decision by processing the classification decisions from the classification component.

23. The computer readable storage medium of claim 21, wherein the set of data points is represented in the subsets of data points in the memories of the processing units.

24. The computer readable storage medium of claim 21, wherein the classification components are transferred to each of the processing units to execute and train using the subsets of data points at each of the processing units.

25. The computer readable storage medium of claim 21, wherein each classification component comprises a decision tree having nodes, wherein the set of data points has M variables, and wherein each node of the decision trees randomly selects m of the M variables on which to base a decision for the node.

26. The computer readable storage medium of claim 25, wherein each decision tree comprises a classification and regression tree (CART) and wherein the CART decision trees form a random forest of trees.

27. The computer readable storage medium of claim 21, further comprising:
   gathering classification decisions from the classification components to form a validation set; and
   training a validation classification component on the validation set to produce a second level classification based on the validation set.

28. The computer readable storage medium of claim 27, wherein the classification components use a first decision algorithm to generate a classification decision and wherein the validating classification component uses a second algorithm to generate the second level classification from the validation set.

29. The computer readable storage medium of claim 27, wherein the classification components are trained on a training subset of the set of data points.

30. The computer readable storage medium of claim 29, wherein the subsets in the memories of the processing units are represented in the training subset.

* * * * *

UNITED STATES PATENT AND TRADEMARK OFFICE
CERTIFICATE OF CORRECTION

| | | |
|---|---|---|
| PATENT NO. | : 7,783,114 B2 | Page 1 of 1 |
| APPLICATION NO. | : 11/466403 | |
| DATED | : August 24, 2010 | |
| INVENTOR(S) | : Bradski et al. | |

It is certified that error appears in the above-identified patent and that said Letters Patent is hereby corrected as shown below:

In the Specification, Column 2, Line 5, insert:

--This invention was made with Government support under PO# 097001 awarded by the Department of Defense. The Government has certain rights in this invention.--

Signed and Sealed this
Twentieth Day of October, 2015

Michelle K. Lee
*Director of the United States Patent and Trademark Office*